UNITED STATES PATENT OFFICE.

GEORGE T. LEWIS, OF PHILADELPHIA, PENNSYLVANIA.

PROCESS OF PREPARING OXIDE-OF-ZINC PIGMENT.

SPECIFICATION forming part of Letters Patent No. 502,822, dated August 8, 1893.

Application filed July 17, 1891. Serial No. 399,821. (No specimens.)

*To all whom it may concern:*

Be it known that I, GEORGE T. LEWIS, of the city and county of Philadelphia, State of Pennsylvania, have invented a certain new and useful Process of Preparing Oxide-of-Zinc Pigment, of which the following is a true and exact description.

My invention relates to the preparation of oxide of zinc for use as a pigment and especially to zinc oxide mixed or contaminated with the salts of zinc and sulphur known as zinc sulphate and zinc sulphite. These salts which occur in oxide of zinc made from ores containing sulphur are highly objectionable and greatly diminish the usefulness and value of the pigment. I have discovered however that the zinc oxide can be entirely freed from the sulphate and sulphite of zinc by subjecting it to the action of water preferably heated, and containing some caustic alkali such as soda ash, caustic potash or similar salts in solution. The salts of zinc and sulphur being soluble are dissolved by the action of the water and washed out from the zinc oxide. The sulphur unites with the soda, if a soda salt is used, forming a soluble soda sulphate or sulphite as the case may be; and the zinc will be precipitated as an oxide, thus saving all the zinc and removing the objectionable salts which injure the pigment.

Having now described my invention, what I claim as new, and desire to secure by Letters Patent, is—

The method of preparing zinc oxide containing sulphate and sulphite of zinc for use as a pigment in such a manner as to save all the zinc, which consists in treating the impure zinc oxide with water containing a caustic alkali in solution whereby the sulphur salts of zinc may be dissolved by the water and the zinc combined with sulphur reprecipitated by the alkali as zinc oxide.

GEORGE T. LEWIS.

Witnesses:
H. B. RIANHARD,
H. R. SHULZ.